(12) United States Patent
Ohanian

(10) Patent No.: US 6,896,799 B2
(45) Date of Patent: May 24, 2005

(54) FISH AQUARIUM

(76) Inventor: Garabet Nemer Ohanian, DHL Kuwait Company, Ardiyah Industrial Area, Behind Sony Workshop, Safat (KW), 13126

(*) Notice: Subject to any disclaimer, the term of this patent is extended or adjusted under 35 U.S.C. 154(b) by 0 days.

(21) Appl. No.: 10/463,821

(22) Filed: Jun. 16, 2003

(65) Prior Publication Data

US 2004/0251186 A1 Dec. 16, 2004

(51) Int. Cl.[7] .............................................. A01K 63/04
(52) U.S. Cl. .................... 210/169; 210/416.2; 119/248; 119/259
(58) Field of Search ................................ 210/169, 232, 210/252, 263, 416.1, 416.2, 428; 119/248, 259

(56) References Cited

U.S. PATENT DOCUMENTS

| | | | |
|---|---|---|---|
| 3,638,616 A | | 2/1972 | Carmouche |
| 3,757,739 A | * | 9/1973 | Whitener ..................... 119/261 |
| 3,785,342 A | * | 1/1974 | Rogers ........................ 119/259 |
| 4,151,810 A | * | 5/1979 | Wiggins ...................... 119/262 |
| 4,913,811 A | | 4/1990 | Huang et al. |
| 5,171,437 A | * | 12/1992 | Fletcher, Sr. ................. 210/169 |
| 5,640,930 A | | 6/1997 | Kirby |
| 5,690,054 A | | 11/1997 | Allen |
| 5,849,185 A | | 12/1998 | Judy, Jr. |
| 6,067,937 A | * | 5/2000 | Boschert ..................... 119/247 |
| 6,234,113 B1 | * | 5/2001 | Dor ........................... 119/259 |
| 6,659,043 B1 | * | 12/2003 | Huska ........................ 119/226 |
| 2003/0209204 A1 | * | 11/2003 | Stutz et al. .................. 119/259 |

* cited by examiner

Primary Examiner—Fred G. Prince
(74) Attorney, Agent, or Firm—Streets & Steele; Frank J. Campigotto

(57) ABSTRACT

An aquarium system comprising a water-tight fish tank and a screening means that divides the fish tank into an upper section and a lower section, one or more barriers that divide the lower section into two or more separate compartments, and two or more outlet orifices are located in the fish tank bottom. A gravel bed is supported on the screening means. A water pump circulates water from each of the outlet orifices, through a water filter, to the upper section of the fish tank. The velocity of the water circulated through the gravel bed by the water pump flushes any waste material from the gravel bed. A flushing velocity may be maintained because the gravel bed covering each separate compartment may be flushed separately.

24 Claims, 2 Drawing Sheets

FISH AQUARIUM

BACKGROUND OF THE INVENTION

1. Field of the Invention

This invention relates generally to fish tanks and more particularly to a system for cleaning fish aquariums.

2. Description of the Related Art

Keeping fish in an aquarium is a popular hobby throughout the world. While documentation of people keeping fish for purposes other than food consumption can be traced back to the early Romans, Greeks, Egyptians and Chinese, the first glass aquariums were built in the mid 1800's. The popularity of the home aquarium makes the home aquarium hobby one of the most popular hobbies in the world and supports a large and still growing industry.

One complaint that many aquarium hobbyists have is that the aquarium must be cleaned on a regular basis to protect the aquatic life and to prevent objectionable odors that result from fish wastes, decayed food particles and bacteria that accumulate in the aquarium. Cleaning the aquarium is a time-consuming and dirty burden that is placed on the aquarium hobbyist. Cleaning the aquarium normally includes removing all the aquatic life, which is primarily the fish but may include plants, and other ornamentals and then vacuuming the aquarium gravel that serves as a filter to remove the objectionable material.

There have been many attempts to lessen this burden of cleaning the aquarium by making it simpler. One solution has been to develop a system for separating a fish section in a top portion of the aquarium from a waste section in the bottom of the aquarium by placing a screening material between the two sections. Such systems have developed gradually in the prior art. For example, U.S. Pat. No. 4,913,811 issued to Huang, et al., discloses a gatherer to collect the solid impurities in the aquarium in a slot and a rotating helical brush that is provided to push the solid impurities into one end of the slot for removal.

In U.S. Pat. No. 5,640,930 issued to Kirby, an automatic cleaning aquarium is disclosed having a top aquatic section and a bottom waste section separated by a grate-supported screen. The bottom waste section is formed with tapered walls that funnel to a flushing valve. Periodically, the flushing valve may be opened to flush waste from the waste section, and then fresh water may be added to the aquarium to replace the water flushed from the system.

In U.S. Pat. No. 5,690,054 issued to Allen, an undergravel filter is supported on a base having a sloped bottom surface in such a manner that wastes, trapped by the undergravel filter, fall to the bottom and are then moved by gravity to the lowest portion of the sloped bottom surface where an outlet flushing valve is located. The flushing valve may be opened to drain water from the aquarium and flush away the wastes that have accumulated.

In U.S. Pat. No. 5,849,185 issued to Judy, a specially designed plastic housing is disclosed that fits into any standard fish tank. The plastic housing has sloped sides that terminate at their low spots with drain valves. The top of the plastic housing provides a separation between the area of the fish tank dedicated for the fish and the lower area having the sloped sides forming the waste removal system.

A problem still unsolved in the prior art is the inability of the flushing systems to flush waste material from the gravel bed, which serves as a filter in aquariums and traps large amounts of waste material. The traditional method of cleaning an aquarium by vacuuming the gravel bed, removes this waste material but stirs up the waste material in the process, putting some of the waste material back into the water. The prior art methods typically discard waste-containing water from the aquarium during the cleaning process, and this water has to be replaced with makeup water at an amount greater than that necessary to maintain an ideal mineral balance in the water. Adding more water than the ideal amount changes the chemical balance in the water and reduces the concentration of helpful bacteria in the water necessary to maintain a healthful environment for the fish. Furthermore, changing the water quality by large increments, as occurs when significant amounts of makeup water must be added, upsets the equilibrium within the tank and is harmful to the aquatic life.

A system that cleans an aquarium without requiring large amounts of flushing water to be removed and replaced with makeup water would be beneficial to the aquatic life in the aquarium. It would further be beneficial if the system removes waste materials from the gravel filters in the bottom of the aquarium.

SUMMARY OF THE INVENTION

The present invention provides an aquarium system that simplifies maintaining the cleanliness of an aquarium. The system comprises a water-tight fish tank and a screening means that divides the fish tank into an upper section and a lower section. The screening means extends to the perimeter of the fish tank. The system further comprises one or more barriers that divide the lower section into two or more separate compartments, wherein the barriers extend from the screening means to a bottom of the fish tank. Two or more outlet orifices are located in the fish tank bottom, wherein each of the separate compartments has one outlet orifice and each outlet orifice is connected to a valve that may be opened when flushing the separate compartment is desired. At least one of the barriers used to separate the bottom section into separate components may slope towards one of the outlet orifices. The system further includes a water pump having a suction in fluid communication with each of the valves connected to the outlet orifices of each of the separate compartments and having a discharge in fluid communication with a water filter. The water pump circulates water from each of the outlet orifices, through the water filter, to the upper section of the fish tank.

The aquarium system further includes a base, wherein the sides of the base enclose the lower section to hide it from view.

A controller may be provided for opening and closing the valves and for starting and stopping the water circulation pump. The valves may be operated by the controller when the valves have, for example, solenoid or pneumatic valve actuators.

The screening means that separates the upper and lower sections of the fish tank may be, for example, a grate or a grate that is covered by netting or screen. The screening means has openings that are sized and shaped to prevent displayed aquatic life and material from passing therethrough while allowing passage of waste products and uneaten food that are related to the culture of the displayed aquatic life. The screening means further supports a gravel bed that may be used for decorative purposes and/or as an undergravel filter component.

The system may further comprise a second pump having a suction in fluid communication with each of the two or more valves, wherein the second pump is activated to increase water flow through one or more of the outlet orifices. The discharge of the second pump is in fluid communication with the discharge of the water pump. Alternatively, the discharge of the second pump may be in fluid communication with a second filter, wherein the second pump circulates water from each of the outlet orifices, through the second filter, and back to the upper section of the fish tank.

The lower section contains between about 5% and about 50% of the water volume of the fish tank. Alternatively, the lower section contains between about 10% and about 30% of a water volume of the fish tank.

The present invention further comprises a method for cleaning an aquarium. The method includes opening a first valve in fluid communication between a first compartment in a lower section of the aquarium and a water pump suction and circulating water from the first compartment through a water filter to a top section of the aquarium. The method further includes filtering waste materials from the water circulating through the water filter and closing the first valve and opening a second valve in fluid communication between a second compartment in the lower section of the aquarium and the water pump suction.

Optionally, the method includes activating a second pump to increase the water circulation rate through the water filter. The first and second valves are opened and closed automatically by a controller. Alternatively, the first and second valves may be opened and closed manually.

Circulating the water from the first compartment further comprises flushing wastes from an undergravel filter that separats the lower section from the upper section.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
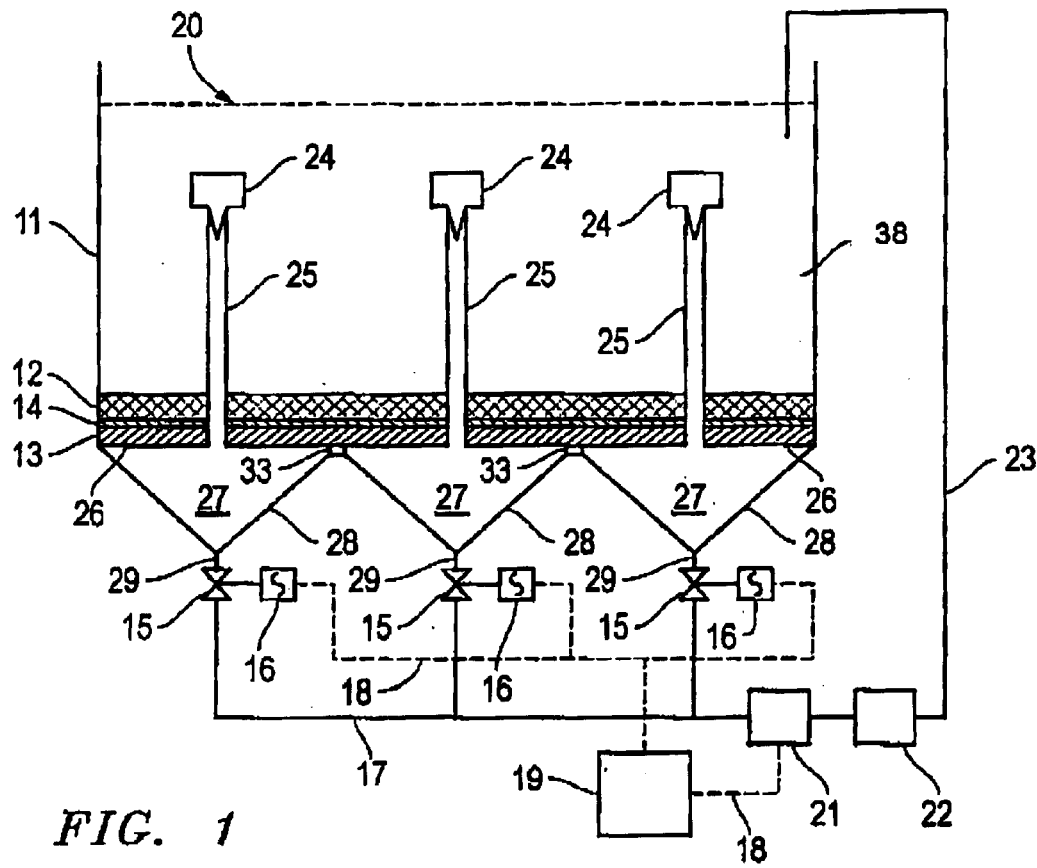
FIG. 1 is a cross sectional view of an aquarium that may be maintained in accordance with the present invention.

The present invention provides an aquarium system that simplifies aquarium maintenance. The system includes a water-tight fish tank that is divided into an upper section and a lower section by a screening means capable of supporting an undergravel filter. The screening means extends across the cross sectional area of the tank and generally rests on perimeter supports. The upper section provides the habitat for the aquatic life within the aquarium and is presented for viewing. The lower section is hidden from view within a supporting cabinet and provides a settling area for waste generated by the aquatic life within the aquarium and further provides draining and flushing hardware for use during the removal of the waste.

The lower section is divided into two or more separate compartments by barriers that extend from the bottom of the fish tank to the screening means. Outlet orifices are located in the fish tank bottom in each of the separate compartments. A valve is mounted on the outlet side of each orifice so that when the valve on a separate compartment is opened, that separate compartment may be drained and flushed individually.

The system further provides a water pump that takes suction from each of the individual valves on the outlets of the separate compartments. The water pump pumps water from each of the separate compartments having an open valve. If the outlet valve on a separate compartment is closed, then the pump cannot pump water from that separate compartment until the outlet valve of the separate compartment is opened. If all the valves on the separate compartments are opened, then the water pump takes suction from all of the separate compartments. Suction to the water pump from each of the outlet valves may be provided through a manifold of tubing made, for example, from polyvinylchloride, copper, plastic, stainless steel, or combinations thereof.

The water pump pumps the water from one or more of the separate compartments through a filter that removes waste materials that were generated by the aquatic life within the water tank and uneaten food. The filter medium may comprise, for example, activated charcoal, foam, poly fiber, sponge and other materials known to those having ordinary skill in the art. Clean filtered water exits the filter and is returned to the upper section of the water tank. The filter is cleaned or the filtering medium is changed when necessary to remove the buildup of waste material that has been filtered from the aquarium.

An aquarium is a complex ecosystem that is balanced when running optimally. Food and oxygen must be added to sustain the aquatic life and waste products from the aquatic life and uneaten food must be removed. Beneficial bacteria grow in the aquarium, usually in the undergravel filter, to help remove some of the harmful waste products, such as ammonia. Any upset in the balance of the ecosystem is potentially harmful to the aquatic life and the beneficial bacteria. Therefore, aquarium owners try to maintain the ecosystem balance and refrain from acts that create swings in the balance.

In a conventional aquarium, an undergravel filter removes waste products from the water within the aquarium by circulating tank water down through a raised gravel bed on the bottom of the tank and then back to the top of the tank through the undergravel lift tube. Water may be sucked from the top of an undergravel lift tube, pulling water through the gravel bed and up through the lift tube. The beneficial bacteria reside in the bed of gravel and feed on the waste products contained in the water circulating through the gravel bed. Uneaten food and other waste products are filtered out and trapped in the gravel bed. Several times per year, the gravel bed must be siphon vacuumed to remove the trapped waste particles within the gravel bed. This is the dirty and time consuming chore that is dreaded by so many aquarium owners. When the gravel bed is siphon vacuumed, large quantities of the aquarium water are removed and must be replaced with makeup water having different mineral content, thus upsetting the mineral balance of the ecosystem of the aquarium. Furthermore, mixing the undergravel filter during the siphon vacuuming process disturbs the bacteria beds, which reside only in the upper levels of the gravel, thereby causing further disturbance in the ecosystem balance of the aquarium.

An advantage of the present invention is that the waste particles trapped in the gravel bed may be removed without siphon vacuuming. The water pump that circulates water from the separate compartments flushes the waste particles from the gravel bed and captures the waste particles in the filter. Circulating the water through a filter removes the waste particles and returns the cleaned water to the tank so there is no need to add makeup water to the aquarium.

The separate compartments in the bottom section of the aquarium are sized so that the water pump can pull a sufficient amount of water through the gravel bed to flush the waste particles from the bed. One pump alone is not sufficient to pull an adequate amount of water through the full gravel bed to dislodge the waste particles without also causing excess water circulation through the top section of the aquarium, which would disturb the aquatic life. However, by dividing the gravel bed into sections, the water pump can circulate enough water through just one section of the gravel bed at a time to dislodge the trapped particles and flush them away, trapping them in the filter. In effect, by dividing the lower section into separate compartments, the gravel bed is also divided into separate sections to that the water pump pulls water through just one section of the gravel bed at a time, thereby increasing the flushing volume through that section of the gravel bed to remove and flush out waste particles from that section.

Preferably, the barriers that form the separate compartments may slope towards the outlet orifice, so that particles that do get pulled through the undergravel bed by the undergravel lift tube can settle out by gravity close to the outlet orifice. Then, when the water pump begins to pull water from the separate compartment, the settled material is quickly removed, passing through the pump suction and becoming trapped in the filter. This prevents any settled waste from remaining on the bottom of the separate compartments after the pump has sucked the waste particles from the undergravel bed.

Another advantage of the present invention is that waste particles are removed continuously because the pump pulls water through different sections of the gravel bed at all times. Periodically, for example at feeding time, a slight manual stirring of the gravel bed helps dislodge trapped particles so that they can be flushed out when the pump pulls water through the gravel beds to remove the waste. This slight stirring does not disturb the beneficial bacteria growing in the gravel beds, and the optional daily stirring helps remove all the trapped particles over time, maintaining a clean and healthful ecosystem for the aquatic life.

Preferably, each of the valves is operated by a controller that switches the separate compartments that are being directed to the suction of the water pump. The valves may be operated by solenoids or by pneumatic actuators. The controller is programmed to switch between each of the separate compartments so that each compartment is flushed for the same interval during a twenty four hour period. Alternatively, each valve may be operated by hand so that the separate compartments are flushed equally over a given time period. The controller may also be programmed to turn the water pump off and on. The controller may be, for example, a personal computer or a controller based upon the X-10 home automation system as known to those having ordinary skill in the art.

Preferably the screening means is a mesh that is supported by a grate. The openings in the mesh, or screen, must be sized and shaped to prevent aquatic life from passing therethrough and to prevent the gravel from passing through to the bottom section. Alternatively, a grate may be used to support the gravel without a mesh or screen, but the passageways through the grate must still be sized and shaped to prevent the passage of aquatic life and gravel therethrough. If the grate is covered with screen or mesh, the grate merely provides support for the screen or mesh and may have fairly large openings since the mesh or screen will prevent the passage of gravel and aquatic life to the bottom section. The grate may have openings that range from several inches wide down to about one eighth inch wide.

The lower section does not have to contain a large percentage of the total volume of the aquarium. The lower section may range from about 5% to about 50% if the water volume of the aquarium. Alternatively, the lower section may range from about 10% to about 30% of the water volume of the aquarium.

The lower section may be divided into as many separate compartments as necessary to ensure adequate flushing of the gravel bed. Larger aquariums may have more separate compartments than smaller aquariums. Preferably in aquariums having undergravel filters, each of the separate compartments has an undergravel lift tube so that water may be circulated through the gravel bed from the top section through the lift tube. Alternatively, a separate water circulation pump could be dedicated to circulating water through the gravel bed at gravel filtration rates through a separate manifold system from the outlet orifice of each separate chamber.

Preferably, the aquarium may be made of acrylic, although glass and other materials known to those having ordinary skill in the art may also be used. Acrylic is a strong light-weight material having exceptional clarity and translucence and is suitable for forming both the lower section and the upper section of the aquarium as known to those having ordinary skill in the art.

It should be noted that for smaller aquariums, separate compartments in the bottom section are not necessary as one pump may circulate enough water through a small gravel bed to remove the entrapped waste particles. For small aquariums, only one outlet orifice is required to provide suction to the water pump.

The barriers that form the separate compartments in the bottom section should form a seal between the screening means and the barriers. This may be accomplished by providing a gasket material on the ends of the barrier. With the weight of the gravel added on top of the screening means, the screening means pushes down upon the barrier, compressing the gasket material and creating a seal that prevents water from adjacent compartments from leaking into the separate compartment being flushed. Such leakage would decrease the pumping capacity of the pump available for pulling water through the gravel bed.

A method for cleaning an aquarium in accordance with the present invention includes opening an outlet valve on one of the separate compartments to provide fluid communication between the suction of the water pump and the separate compartment. Turning on the pump provides water circulation from the top section of the aquarium, through the gravel bed above the separate compartment, then through the separate compartment to the suction of the pump. The flow of water through the gravel bed flushes out waste particles trapped in the bed and the waste particles are carried by the water to the water pump suction. From the discharge of the water pump, the water circulates thorough a filter for removal of the waste particles, and then returns to the top section of the aquarium.

After a set time period, the outlet valve on the separate compartment is closed and the outlet valve on a second separate compartment is opened. This establishes water circulation through a second section of the gravel bed, thereby flushing the waste particles out of that section of the bed.

Optionally, a second pump may be included to increase the circulation rate of the water through the bed for a set time period. Varying the flow through the bed in surges, as would occur when the second pump is turned on, helps dislodge and flush out some of the trapped waste particles. The second pump may have a separate filter on the discharge of the second pump. Alternatively, the water from the discharge of the second pump may be directed to the filter inlet on the discharge of the first water pump.

When the filters become plugged from the waste materials that have been filtered out of the circulating water, the filter medium is replaced or cleaned.

Optionally, the method further includes manually stirring the gravel bed slightly to help dislodge trapped waste particles. The bed may be manually stirred, for example, once a day when the aquatic life is fed.

FIG. 1 is an aquarium that may be maintained in accordance with the present invention. A water tank 11 is divided into an upper section 38 and a lower section having separate compartments 27. The upper section 38 and the lower section having the separate compartments 27 are separated by a screen 14 that is supported on a grate 13. A bed of aquarium gravel 12 is supported by the grate 13. Undergravel lift tubes 25 with power heads 24 provide water circulation through the gravel bed 12. Because each separate compartment 27 is separated from the other separate compartments 27, preferably each separate compartment 27 has a dedicated lift tube 25.

The separate compartments 27 are formed with barriers 28 that extend from the grate 13 to the bottom of the aquarium. The barriers 28 are preferably sloped to direct settled waste material to an outlet orifice 29 provided at the bottom of the aquarium tank 11 in each of the separate compartments 27. Gasket material 33 may be placed on the top edge of a barrier 28 to help seal between the barrier 28 and the grid 13 or screen 14. A valve 15 operated by a solenoid 16 is attached by a suitable fitting, such as a threaded nipple, to each outlet orifice 29. Tubing 17 connects the valves 15 to the suction of the water pump 21. A controller 19 send control signals 18 to the valve solenoids 16 to open and close the valves 15 and to the pump 21 to turn the pump on and off.

A filter 22 filters out waste particles contained in the water pumped by the water pump 21. A tubing 23 carries the filtered water from the filter 22 to the upper section 38 of the water tank 11. The tubing 23 discharges just below the normal water level 20 of the water tank 11.

Figure 2:
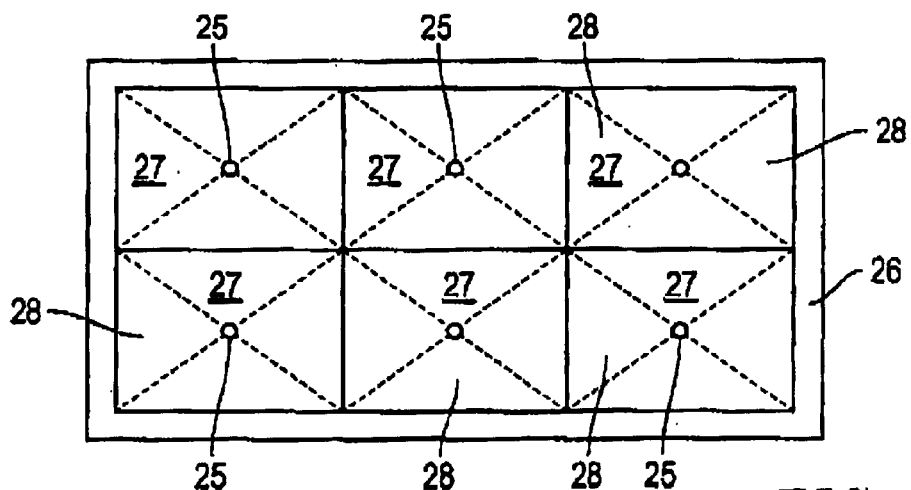
FIG. 2 is a top view of the lower section of an aquarium that is divided into separate compartments in accordance with the present invention.

FIG. 2 is a top view of the lower section of an aquarium that is divided into separate compartments in accordance with the present invention. Barriers 28 divide the lower section into separate compartments 27. An outlet orifice 25 is located at the bottom of each separate compartment 27. A ledge 26 is provided to support the aquarium tank on a base 31 (See FIG. 3). Each of the barriers 28 are slanted towards an outlet orifice 25.

Figure 3:
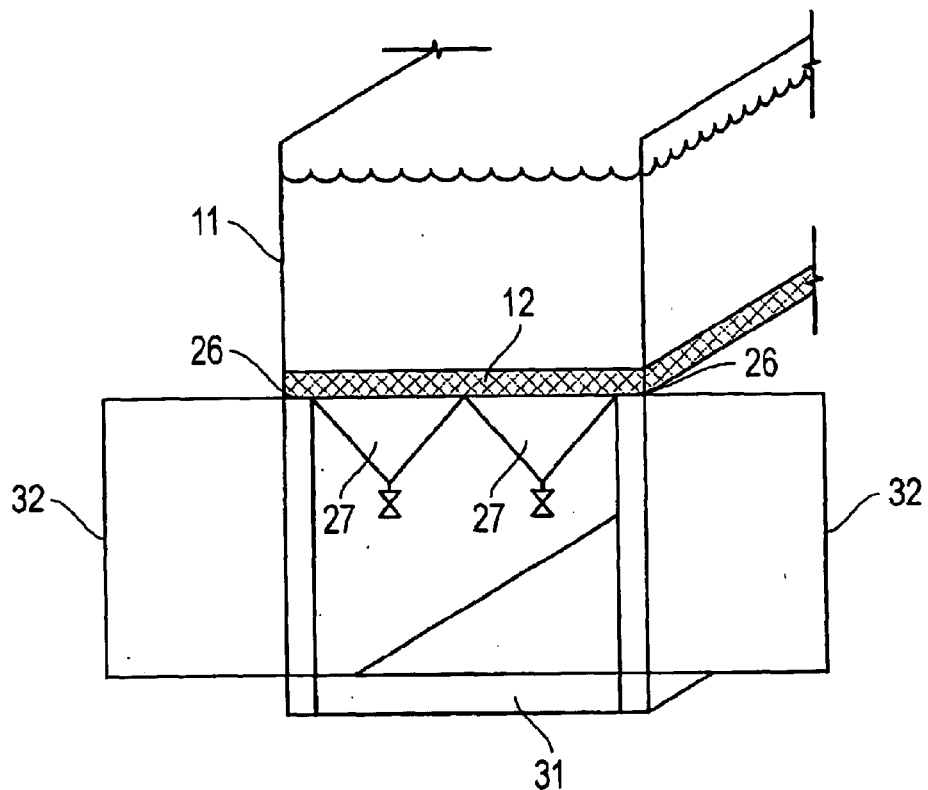
FIG. 3 is a perspective view of an aquarium with a base in accordance with the present invention.

FIG. 3 is a perspective view of an aquarium with a base in accordance with the present invention. The water tank 11 is supported on a base 31 having doors 32 that may be closed to hide from view the lower section having separate compartments 27. The base 31 supports the water tank 11 on the ledge 26 formed between the upper section 38 of the tank 11 and the lower section having separate compartments 27. The pump 21, filter 22, controller 19, and tubing 17,23 as shown in FIG. 1, may all be hidden from view inside the base 31 behind the closed doors 32.

Figure 4:
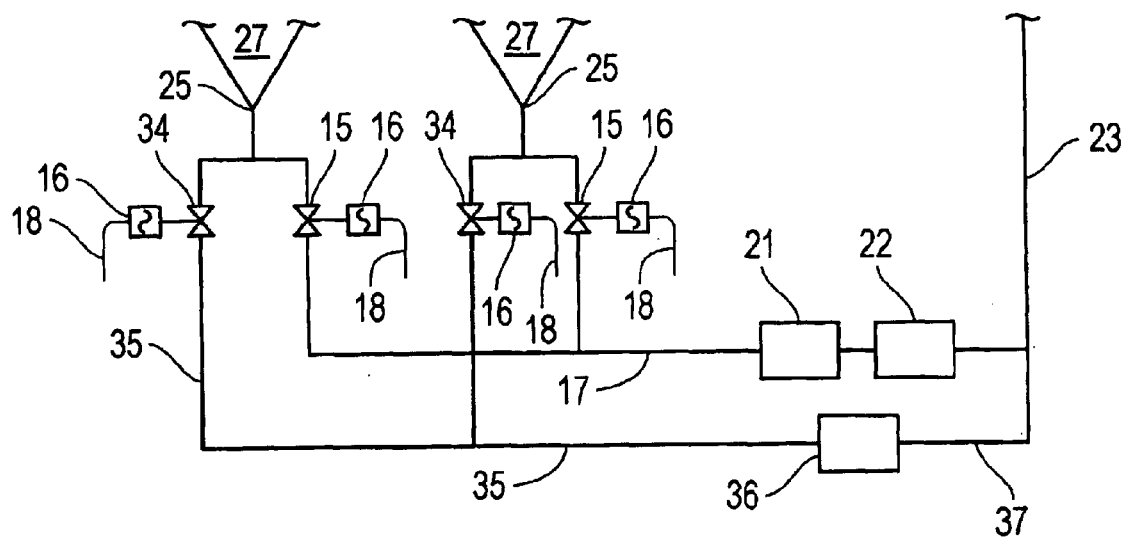
FIG. 4 is a cross sectional view of an alternate manifold system that replaces the need for lift tubes in accordance with the present invention.

FIG. 4 is a cross sectional view of an alternate manifold system that replaces the need for lift tubes in accordance with the present invention. If desired, the lift tubes 23 (See FIG. 1) may be replaced with a second pump 36 that circulates water from all of the separate compartments 27 at the same time. A circulation valve 34 is placed in parallel with the flush valve 15 at each outlet orifice 25. All the circulation valves 34 are left open so that the circulation pump 36 pulls water through the gravel bed and out through each circulation valve 34. The water is then returned to the water tank 11 through the return tubing 23. The circulation valves 34 may be controlled by the controller 19 (See FIG. 1) with control signals 18 running to solenoids 16 as actuators on the circulation valves 34.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. An aquarium system, comprising:
   a water-tight fish tank;
   a screening means dividing the fish tank into an upper section and a lower section, wherein the screening means extends to the perimeter of the fish tank;
   one or more barriers dividing the lower section into two or more separate compartments, wherein the barriers extend from the screening means to a bottom of the fish tank;
   two or more outlet orifices located in the fish tank bottom, wherein each of the separate compartments has one outlet orifice;
   two or more valves, wherein each outlet orifice is connected to one valve;
   a water pump having a suction in fluid communication with each of the two or more valves; and
   a water filter in fluid communication with a discharge of the water pump, wherein the water pump circulates water from each of the outlet orifices, through the water filter, to the upper section of the fish tank.

2. The system of claim 1, further comprising:
   a base, wherein sides of the base enclose the lower section to hide it from view.

3. The system of claim 2, further comprising:
   a controller for opening and closing the valves.

4. The system of claim 3, wherein the valves are operated with solenoids.

5. The system of claim 1, wherein the screening means is a grate.

6. The system of claim 5, wherein the grate has openings less than one quarter inch wide.

7. The system of claim 5, wherein the grate has openings less than one eighth inch wide.

8. The system of claim 5, wherein the grate is covered with a mesh.

9. The system of claim 8, wherein openings in the mesh are smaller than the grate openings.

10. The system of claim 1, wherein the screening means has openings sized and shaped to prevent displayed aquatic life and material from passing therethrough while allowing passage of waste products that are related to the culture of the displayed aquatic life.

11. The system of claim 1, wherein the screening means supports aquarium gravel.

12. The system of claim 1, wherein at least one of the barriers slope towards the outlet orifice.

13. The system of claim 1, further comprising a second pump having a suction in fluid communication with each of the two or more valves, wherein the second pump is activated to increase water flow though one or more of the outlet orifices.

14. The system of claim 13, wherein a discharge of the second pump is in fluid communication with the discharge of the water pump.

15. The system of claim 13, wherein a discharge of the second pump is in fluid communication with a second filter, wherein the second pump circulates water from each of the outlet orifices, through the second filter, to the upper section of the fish tank.

16. The system of claim 1, wherein the screening means contains one or more openings sized for inserting a lift tube into each of the one or more openings.

17. The system of claim 1, wherein the lower section contains between about 5% and about 50% of a water volume of the fish tank.

18. The system of claim 1, wherein the lower section contains between about 10% and about 30% of a water volume of the fish tank.

19. The aquarium system of claim 1, further comprising:
gasketing material between the screening means and the one or more barriers.

20. A method for cleaning an aquarium, comprising:

opening a first valve in fluid communication between a first compartment in a lower section of the aquarium and a water pump suction;

circulating water from the first compartment through a water filter to a top section of the aquarium;

filtering waste materials from the water circulating through the water filter; and closing the first valve and opening a second valve in fluid communication between a second compartment in the lower section of the aquarium and the water pump suction.

21. The method of claim 20, comprising:

activating a second pump to increase the water circulation rate through the water filter.

22. The method of claim 20, further comprising:

activating a second pump to increase the water circulation rate, wherein the increased water circulation passes through a second filter.

23. The method of claim 19, wherein the first and second valves are opened and closed automatically by a controller.

24. The method of claim 20, wherein the step of circulating the water from the first compartment further comprises:

flushing wastes from an undergravel filter separating the lower section from the upper section.

* * * * *